United States Patent
von Schleinitz

(10) Patent No.: US 10,087,990 B2
(45) Date of Patent: Oct. 2, 2018

(54) FRICTION-ENHANCING LACQUER AND BEARING COMPONENT COATED THEREWITH

(71) Applicant: Thilo von Schleinitz, Schweinfurt (DE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 185 days.

(21) Appl. No.: 15/019,177

(22) Filed: Feb. 9, 2016

(65) Prior Publication Data

US 2016/0195135 A1    Jul. 7, 2016

Related U.S. Application Data

(62) Division of application No. 13/991,327, filed as application No. PCT/EP2011/072028 on Dec. 7, 2011, now Pat. No. 9,291,202.

(30) Foreign Application Priority Data

Dec. 7, 2010 (DE) .................. 10 2010 062 562
Mar. 23, 2011 (DE) .................. 10 2011 005 921

(51) Int. Cl.
| | |
|---|---|
| *B32B 9/00* | (2006.01) |
| *F16C 33/62* | (2006.01) |
| *C09D 5/10* | (2006.01) |
| *F16B 2/00* | (2006.01) |
| *F16C 35/06* | (2006.01) |
| *C09D 175/04* | (2006.01) |

(Continued)

(52) U.S. Cl.
CPC .............. *F16C 33/62* (2013.01); *C09D 5/106* (2013.01); *C09D 7/61* (2018.01); *C09D 175/04* (2013.01); *F16B 2/005* (2013.01); *F16C 33/586* (2013.01); *F16C 35/06* (2013.01); *C08K 3/10* (2013.01); *C08K 3/38* (2013.01); *F16C 2360/31* (2013.01); *Y10T 29/49696* (2015.01)

(58) Field of Classification Search
None
See application file for complete search history.

(56) References Cited

U.S. PATENT DOCUMENTS 5,074,677 A * 12/1991 Andree .................. B66C 23/84
                                                         384/448
5,851,675 A * 12/1998 Oyagi .................. C03C 14/004
                                                         29/724

(Continued)

FOREIGN PATENT DOCUMENTS

| EP | 1764522 A2 | 3/2007 | |
|---|---|---|---|
| EP | 2008725 A1 | 12/2008 | |
| WO | WO2011041527 * | 4/2011 | ............... C09D 5/00 |

*Primary Examiner* — Seth Dumbris
(74) *Attorney, Agent, or Firm* — Bryan Peckjian; SKF USA Inc. Patent Dept.

(57) ABSTRACT

A friction-enhancing lacquer contains a binder and hard material particles. The hard material particles include a titanium-boron compound or consist essentially of a titanium-boron compound, such as titanium diboride. The friction-enhancing lacquer is applied to the surface of a machine part, such as a bearing inner ring, outer ring or other bearing component, in order to increase its coefficient of friction and minimize or prevent slippage relative to another machine part clamped thereto. Also a bearing component coated with such a lacquer.

18 Claims, 1 Drawing Sheet

(51) Int. Cl.
    *F16C 33/58*    (2006.01)
    *C09D 7/61*     (2018.01)
    *C08K 3/10*     (2018.01)
    *C08K 3/38*     (2006.01)

(56) References Cited

U.S. PATENT DOCUMENTS

| | | | | |
|---|---|---|---|---|
| 6,062,735 A | * | 5/2000 | Ward | F16O 23/084 |
| | | | | 384/492 |
| 7,201,790 B1 | * | 4/2007 | Savin | A01N 59/16 |
| | | | | 106/14.05 |
| 2007/0227299 A1 | * | 10/2007 | Marchiando | B22F 3/115 |
| | | | | 75/244 |

* cited by examiner

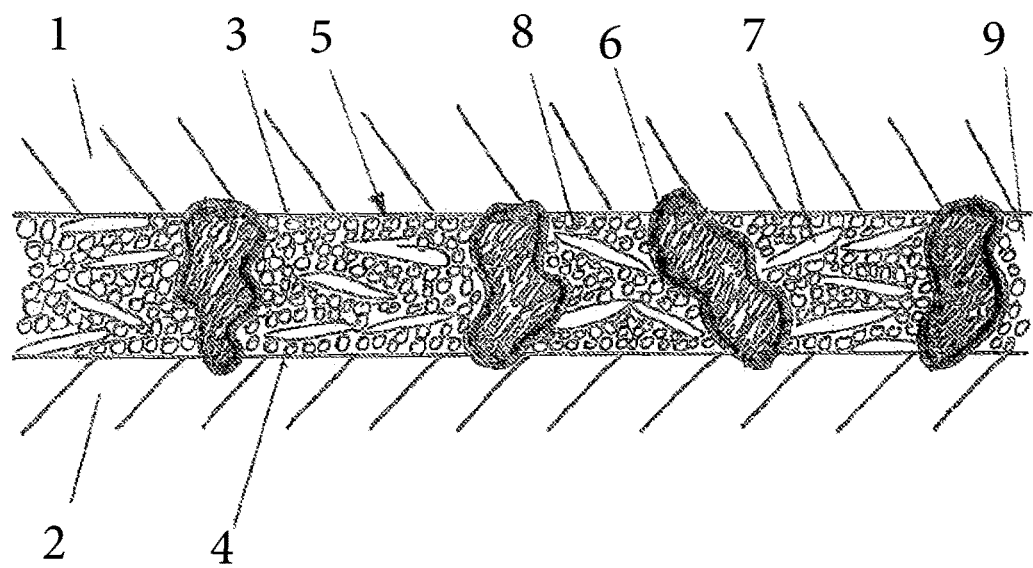

FRICTION-ENHANCING LACQUER AND BEARING COMPONENT COATED THEREWITH

CROSS-REFERENCE TO RELATED APPLICATIONS

This application is a divisional of U.S. patent application Ser. No. 13/991,327 filed Aug. 9, 2013, which application is the U.S. national stage of International Application No. PCT/EP2011/072028 filed on Dec. 7, 2011, which claims priority to German patent application no. 10 2010 062 562.0 filed on Dec. 7, 2010 and to German patent application no. 10 2011 005 921.0 filed on Mar. 23, 2011.

TECHNOLOGICAL FIELD

The invention relates to a friction-enhancing lacquer. The invention furthermore relates to a coated machine part, for example, a bearing inner or outer ring, an assembly made of two machine parts, as well as a method for forming a friction-fit connection between two machine parts.

BACKGROUND

Machine parts can, for example, be reliably connected to one another such that they are pressed against one another with a high contact pressure in the region of the contact surfaces provided for this purpose. The contact pressure can be produced, for example, using bolts, screws, or similar connecting means, which clamp the machine parts against one another in a direction transverse, in particular perpendicular, to the contact surfaces. As long as the frictional force resulting from the friction between the contact surfaces is not overcome, the bond made of the machine parts is mechanically stable, i.e. there is no relative movement between the machine parts. The same applies with regard to the frictional torque.

The amount of the frictional force depends on the contact pressure and on the coefficient of friction of the contact surfaces. A critical situation can occur if the load acting on the bond is so high that the maximum frictional force that can oppose the loading force is overcome. In such a situation, the connecting means, which are primarily designed for a tensile load, are loaded to the point of shearing and can fail, or the bond can be destroyed by internal movements. The bond should therefore be designed such that the available frictional force is not exceeded by dislocating forces during the anticipated operating conditions.

A high frictional force can be achieved by a high contact pressure and a high coefficient of friction. Within certain limits, the production of a high frictional force by a correspondingly high contact pressure is still relatively easy. At very high contact pressures, however, ever higher demands are placed on the tensile load-bearing capacity of the connecting means and also on the pressure load-bearing capacity of the machine parts to be connected, which can be increasingly difficult to meet, or can be met only with unreasonable expenditures. It is therefore desirable, in particular in applications wherein the bond is subjected to high loads, to achieve as high as possible a coefficient of friction. This is for example the case with the fixing of bearings, in particular of rotor bearings, of wind turbines. There it can be required or desirable to achieve as high as possible a frictional torque between an inner ring or an outer ring of the bearing, for example of a double row tapered roller bearing, and an associated attachment flange. The same applies to a bearing having a plurality of inner rings. In such a case, a relative movement between the inner rings should be prevented.

SUMMARY

Therefore, in one aspect of the present teachings, methods and compositions are disclosed for achieving a highest-possible coefficient of friction between the contact surfaces of two machine parts. Preferably, it is possible according to certain aspects of the present teachings to achieve a coefficient of friction higher than that of given surface qualities that can be offered by known coating materials for slip-proof connections based on alkali silicate with zinc dust according to TL/TP-KOR-Stahlbauten, Appendix E, Page 85, Verkehrsblatt Document No. B5259. The high coefficient of friction should preferably be achieved without a prior blasting of the surface, so that no costly surface preparation is required and there is no risk of a contamination of the bearing by abrasive particles.

The inventive friction-enhancing lacquer contains as ingredients a binder and hard material particles, wherein the hard material particles include a titanium-boron compound or consist of a titanium-boron compound.

In a preferred embodiment, the lacquer preferably contains as ingredients a binder and hard material particles, wherein the hard material particles have a Knoop hardness HK 0.1 of at least 2000 N/mm$^2$, preferably at least 2500 N/mm$^2$. For example the Knoop hardness HK 0.1 can be 2600 N/mm$^2$. Alternatively or additionally, the hard material particles can have a Mohs-hardness of at least 8.0, preferably at least 9.0. For example, the Mohs-hardness can be 9.5. Furthermore, at room temperature the hard material particles preferably exhibit a specific electrical resistance of at most $1\times10^{-4}$ Ωcm, preferably at most $5\times10^{-5}$ Ωcm. In particular, at room temperature the hard material particles can have a specific electrical resistance of 9 to $15\times10^{-6}$ Ωcm.

The invention has the advantage that it makes possible the achievement of a very high coefficient of friction. A further advantage is that no costly surface preparation is required, in particular no blasting of the surfaces of the machine parts, to which the lacquer is to be applied. In addition to the advantage of a process simplification, the risk is eliminated that abrasive residues from the blasting process will damage the machine parts in the long term.

An unwanted electric insulation of the machine parts by the lacquer is prevented by the use of electrically conductive hard material particles. In addition, the possibility is created to form a nearly complete-surface, electrically-conducting lacquer layer. This can have advantageous effects for example with regard to the formation of an effective corrosion protection.

The hard material particles can include a ceramic material or consist of a ceramic material. Very high hardnesses can be realized in a cost-effective manner with ceramic materials.

The inventive lacquer can be a polyurethane-based lacquer. Such a lacquer also has a very high adhesion on a substrate which is not optimally prepared. In principle, an epoxy resin-based lacquer is also possible. Furthermore the lacquer is preferably a one-component system. This can be processed with very little expenditure. It is however also possible to form the lacquer as a two-component system.

The hard material particles can include titanium diboride or consist of titanium diboride. Titanium diboride combines a very high hardness and a good electrical conductivity.

The inventive lacquer can be formed as an anticorrosive lacquer and can contain an anticorrosive material as a further ingredient. This has the advantage that corrosion protection is achieved by an application of the lacquer to a surface without additional effort. In particular the inventive lacquer can contain zinc as an anticorrosive material.

The anticorrosive material can be electrically conductive. In particular the anticorrosive material can have an electrical conductivity of at least $1 \times 10^6$ A/Vm, preferably at least $10 \times 10^6$ A/Vm. Typical values lie between 16.7 and $18.3 \times 10^6$ A/Vm. The anticorrosive material can be a solid. This in particular also has the advantage that the compressibility of a layer formed with the lacquer is also limited under high pressures. The possibility results therefrom to form a long-lasting mechanically-stable bond with such a layer. In this case, the anticorrosive material can have a lower hardness than the hard material particles. Furthermore the anticorrosive material can be present at least in part in powder form. Likewise the anticorrosive material can be present at least in part in lamellar form. In particular, the anticorrosive material can include zinc or consist of zinc.

The inventive lacquer can contain additional hard material particles as an additional ingredient. These additional hard material particles can be optimized with regard to another function than the hard material particles. For example, additional hard material particles can be used, which have only slightly varying grain sizes and can thus be used as spacers between the machine parts. For example the additional hard material particles can include boron carbide or consist of boron carbide.

Furthermore, the lacquer can contain a solvent, for example naphtha.

All values listed below regarding percentages of substances refer respectively to the volumes, i.e. % values are vol %.

Based on the volume of the lacquer including the solvent, the solvent content can be 20-40%. The lacquer including the solvent can thereby have a hard material particles content of at least 10%, preferably at least 20%. If additional hard material particles are present, the lacquer can have a content of hard material particles and additional hard material particles of in total at least 10%, preferably at least 20%. Furthermore the lacquer including the solvent can have an anticorrosive material content of at least 10%, preferably at least 20%.

Based on the volume without the solvent, the lacquer can contain a binder content of 20-40%. A higher binder content has the consequence of an inadequate corrosion protection. With a lower binder content, a sufficient adhesive strength of the lacquer to the substrate is no longer ensured. Furthermore, based on the volume without solvent, the lacquer can contain at most 10% additive. For example, the lacquer can contain a thixotropic agent as an additive. Based on the volume without solvent, the lacquer can have a solids content, without binder, of in total at least 50%, preferably at least 70%.

Based on the volume of the lacquer without solvent, binder and additives, the lacquer can contain a content of hard material particles of 30-70%, in particular of 40-60%. A smaller content of hard material particles has the consequence of significantly lower coefficients of friction. For the same reference value, the content of anticorrosive material can be 70-30%, in particular 60-40%. With a smaller content of anticorrosive material, an inadequate corrosion protection results. Moreover, the lacquer can have a content of additional hard material particles of at most 30%, preferably at least 20% as a substitution.

The hard material particles can have a mean grain size of at most 100 µm, preferably at most 60 µm. Moreover, the hard material particles can have a mean grain size of at least 5 µm, preferably at least 10 µm. Furthermore, the hard material particles can have a maximum grain size of at most 150 µm, preferably at most 110 µm.

The invention further relates to a coated machine part with a coating that contains hard material particles made from a titanium-boron compound.

Moreover, the invention relates to an assembly of a first machine part, which has a first abutment surface, and a second machine part, which has a second abutment surface. The first abutment surface or the second abutment surface is coated with the inventive lacquer. Furthermore, the first abutment surface and the second abutment surface are clamped against each other.

The first machine part and/or the second machine part can be formed as a bearing component, in particular of a large bearing, in particular of a wind turbine. The bearing component can be formed as a bearing ring, in particular as an inner ring or an outer ring, in particular of a rolling-element bearing or of a sliding bearing. The first abutment surface or the second abutment surface can for example be a bore surface of an inner bearing, an outside surface of an outer ring, an end surface of an inner ring, an end surface of an outer ring, a bore surface of a housing, an outside surface of a shaft, an end surface of a housing or an end surface of a shaft shoulder.

The coating thickness of the lacquer in the dried state can be at least 15 µm, preferably at least 20 µm. Furthermore, the coating thickness of the lacquer in the dried state can be at most 70 µm, preferably at most 50 µm.

In addition, the invention relates to a method for forming a friction-fit connection between a first machine part and a second machine part. In the inventive method, the inventive lacquer is applied to a first abutment surface of the first machine part or to a second abutment surface of the second machine part. After the drying of the lacquer, the first machine part and the second machine part are pressed against each other in the region of the abutment surfaces, and thereby at least some of the hard material particles contained in the lacquer are pressed into the first abutment surface and into the second abutment surface. The friction fit microconnections thereby formed consequently have a very high coefficient of friction.

By means of a solid contained in the lacquer, for example zinc, it can be achieved that the lacquer coating is no longer significantly compressed upon later-occurring contact pressures, and dimensional changes or wear-promoting micro-movements can occur. A sufficiently stable support of the abutment surfaces is not ensured by the hard material particles alone, since with increasing pressure the hard material particles are pressed ever deeper into the abutment surfaces.

The lacquer can be applied in a coating thickness in the wet state of at least 20 µm, preferably at least 25 µm. Furthermore, the lacquer can be applied in a coating thickness in the wet state of at most 80 µm, preferably at most 60 µm. The lacquer can also be applied to further surfaces of the first machine part or of the second machine part, which do not come into abutment on an opposing surface. The first machine part and/or the second machine part can also be a bearing component, in particular of a large bearing, in particular of a wind turbine.

The invention is explained below in more detail with reference to exemplary embodiments for the composition and the use of the inventive lacquer.

BRIEF DESCRIPTION OF THE DRAWINGS

Here FIG. 1 shows a schematic illustration for explaining an inventively formed friction fit connection.

DETAILED DESCRIPTION

As will be explained in more detail below, after an initially-occurring desired indentation the inventive lacquer is largely incompressible, and has friction-enhancing and anticorrosive properties (including opposing-surface protection with one-sided application). The lacquer is particularly suited as a coating for large bearings, in particular for rolling-element bearing outer surfaces or sliding bearing outer surfaces and inner ring abutment surfaces of double row tapered roller bearings. The lacquer can for example be used with large rolling-element bearings, which are installed in wind turbines or other large machines.

For large bearings, in addition to corrosion protection on outer surfaces, increased coefficients of friction are also desired on some surfaces, onto which something should be flanged, for example. There, however, the corrosion protection requirement is generally lower. Likewise an increase of the coefficient of friction shall be achieved in a simple way e.g. between the inner ring halves.

The requirements for an ideal lacquer for large rolling-element bearings are complex. It should adhere outstandingly on non-blasted and precision-machined steel surfaces, despite their insufficient roughness, for preventing the danger of abrasive residues, which may constitute harmful fine contamination in the long term; it should be easily and faultlessly mixable and evenly applicable with a defined coating thickness; it should cover well and be completed in only a single coating; it should cure very quickly to a mechanically loadable state; in a cured state it should be resistant to abrasion and resistant to high pressure; it must be completely resistant to oil; in application it should have only low inflow into gaps due to capillary action; and it may not creep or flow or give way in the flange connection in a cured state under load. On the other hand, it may not be brittle or prone to chipping, and must have a residual elasticity. At the same time it should offer a maximum corrosion protection and additionally an increased static coefficient of friction.

A part of the requirements can be met by the choice of a moisture-curing one-component polyurethane system, abbreviated below as 1C-PU system, which at approximately 30% binder (i.e. approximately 70% solids in the dried coating, i.e. without solvent) is easily and evenly applicable, fast drying, highly adherent and both chemically and mechanically stable, as well as only slightly compressible despite elasticity due to the fillers. The curing of the lacquer occurs via a crosslinking of functional ends (isocyanate) of the PU system. The volume of the dried coating is approximately 70% of the volume of the wet coating. Coating thicknesses of the dried coating of 40 µm±5 µm have been achieved with a single coating by roller.

Unlike silicates, polyurethane with increased binder content adheres very well even to an unblasted rolling-element bearing surface. In an adhesion test according to DIN EN ISO 4624, the pull-off value of a ground, unblasted steel surface is typically 17-20 MPa, wherein the break upon pull-off occurs within the coating.

The pure corrosion protection can thus be achieved by using a zinc powder content in the dried coating of for example 60% to 70%. Such metal-powder-filled lacquers exhibit no reaction between the solid powder and the binder; the zinc powder is simply "adhered" by the polyurethane to the surface. Thus it is also possible, without limitation, to bond other fillers, as long as they are inert and do not react with the PU.

In principle an endless variance is conceivable, from hard color filler additives such as barium sulfate to soft additives such as talcum powder or PTFE.

For example, if corrosion protection or compressive strength of the matrix is required, a high-coefficient-of-friction powder, in the simplest case for example quartz flour, and possibly also a zinc powder, is added to the lacquer, preferably having a 1C-polyurethane base with moisture curing. The viscosity can be adjusted by the degree of pre-crosslinking of the polyurethane and by the solvent content such that during rolling the desired coating thickness of e.g. 40 µm is achieved.

However, if one replaces the zinc powder entirely or partially with the high-coefficient-of-friction powder, the corrosion protection disappears or is at least reduced. The reason is that it then exists only if the zinc particles contact one another, which requires a very high zinc content—more zinc than would be needed per surface area for a pure galvanic protection.

It is true that zinc-filled lacquer naturally has a higher coefficient of friction, in particular as zinc silicate lacquer, for example alkali silicate lacquer with zinc dust; however this coefficient of friction is neither more finely adjustable nor can it be increased further.

As compared to frictionally-fitting zinc lacquer, a further increase of the friction requires hard particles with microserrations. Friction fit microconnections with the machine parts to be connected can be formed by the hard particles. In addition, the hard particles can serve as anchor points in the coating against a creeping of the high-zinc-content matrix.

The requirement of a friction-enhancing additive is exactly opposite to the requirement for good surface sealing and high corrosion protection. Friction-enhancing additives or abrasive grains reduce the corrosion protection, sometimes drastically. No other traditional additives, such as e.g. micaceous iron oxide, help here; these traditional additives themselves again effect beneficial corrosion protection, but are only frictionally effective; but rather maximum coefficients of friction demand hard particles with microserrations.

Different variants are conceivable for the hard materials as friction-enhancing additives, all based on high hardness and microserration in the application of the contact pressure during mounting.

When it comes to a maximum enhancement of friction, very hard particles are suitable, which have a polygonal geometry, such as for example abrasive grit. In particular, tough and hard abrasive grit varieties are suitable, such as for example monocrystal corundum, cubic corundum, or zirconia corundum. Likewise, quartz flour (Mohs hardness 7), which is available in a cost-effective manner, can also be used. However, the mentioned materials all tend to splinter under pressure. This carries the risk that free grain tips splinter, the effect subsides and a microfine abrasive dust then results on the surface, at the latest upon the dismounting of the large rolling-element bearing. Such a risk can exist in particular if, for example, lacquering should take place between adjacent inner rings of the large bearing to enhance friction, and there is an access from there to the raceways, possibly after dismounting of a sealing ring provided there. In addition, the friction-enhancing effect could be reduced by the disintegration of the hard material particles. For example, after a dismounting and subsequent remounting of the large rolling-element bearing, a sharp loss in effectiveness can already occur with respect to the friction enhancement. If upon the initial mounting the large rolling-element bearing is once again released for unexpected reasons, or mechanically loaded prior to assembly, the effectiveness is already extremely reduced upon the initial mounting. The mentioned materials are thus primarily suitable for a single-use coating, which allows no mounting readjustments and handling errors. Possible applications are definitively only, e.g. outer flange connections on the large rolling-element bearing that are to be tightened only once. In such applications, a significant increase of the coefficient of friction can be achieved inexpensively and well with these materials, but without high corrosion protection.

When it comes to cleanliness, sensitive regions such as the contact of the two inner rings, accompanied by a multiple or at least safer usability with respect to initial mounting and dismounting, it is conceivable to use for example zirconium oxide balls (ZrO2) instead of Al2O3. These have simply a similar hardness to the rolling-element bearing steel and do not splinter, thus could be considered safe. They are for example available as balls, 700 HV, with 68% zirconium oxide and 32% glass phase amorphous silicon oxide. The achievable coefficient of friction is, however, lower than with the abrasive grain varieties mentioned above, since the penetration into hardened rolling-element bearing steel is low due to hardness and shape, and a spherical shape under load tends to roll, if anything.

The above-described material variants each have different advantages and limitations. Common to all of them, however, is that the corrosion protection is largely eliminated.

A further possibility is for example boron carbide powder (boron carbide) B4C. Boron carbide powder is available in suitable grain sizes. For example, a grain size 12-40 µm is available (class F360), which fits, single-layered, into a 40 µm thick PU lacquer coating. Boron carbide powder has a hardness comparable to diamond, but at a considerably lower price. The health risk (from lung and eye exposure to pure dust) disappears as soon as the powder is bonded in lacquer and consequently cannot be inhaled. Here one would have a very stable but inexpensive grain, which hardly splinters under impact-free pressure and can be pressed effortlessly into hardened rolling-element bearing steel—a good symbiosis of the requirements of outer flanges and inner ring connection. However, also with boron carbide powder, no corrosion protection is achieved.

In the context of the invention, preference is given to other hard material particles. According to the invention, it is proposed to furnish the moisture-curing 1C-PU lacquer such that of the approximately 70% hard material content, e.g. approximately 40% to 60% is zinc, and 60% to 40% is a highly electrically conductive hard material related to B4C. This hard material is titanium diboride TiB2. Titanium diboride is an electrically conductive ceramic powder, and to date finds absolutely no application in lacquers. Titanium diboride is available at acceptable prices and in suitable grain sizes. At room temperature, titanium diboride has a specific electrical resistance of 9 to $15 \times 10^{-6}$ Ωcm.

Such a lacquer does not act as an insulator between the joined parts. Due to the excellent conductivity of TiB2, which is itself inert, the remaining zinc particles are furthermore electrically connected to one another, whereby the zinc dust quantity can be lowered significantly without disadvantage to the corrosion protection. There is an active cathodic corrosion protection. A salt spray test shows that, even with a partial damaging of the lacquer coating, the corrosion protection is retained. This results in a corrosion protection to be achieved in the same quality as with a pure polyurethane-zinc lacquer. The corrosion protection achievable with two 40 µm coatings is approximately C4/10 years according to EN ISO 12944-2:2000. Under pressure, the hard material particles even result in a passivated surface or opposing surface to a serrated absolutely bare forced contact, which is electrically intimate as the flat-abutting particle contact which is attenuated by PU. Thus this hard material closes the electrical connection between the decreased zinc particle contents, contacts both surfaces, even through the non-lacquered opposing surface via possible oxide layers (preferably only 1 side of the joined parts is lacquered), and leads to an enhanced-coefficient-of-friction microserration which penetrates into hardened rolling-element bearing steel with less tendency to splinter. The tendency to splinter tends to platy fracture, which increases the likelihood that the fracture remains in the PU matrix. The microserration causes an increase in the coefficient of friction even with oiled or greased surfaces. The Mohs hardness, at 9.5, as with B4C, is directly adjacent to diamond, and the mechanical load-bearing capacity is also not far below the reference B4C as compared using Knoop 3000/2600 and Vickers 3800/3300. A sharp-edged, impression-capable grain and a sifting in full availability of almost all grain sizes results from the splintering crushing method employed by the manufacturer of TiB2. The range mesh size 400 to 700, which corresponds to a largest grain of approximately 50 µm and approximately 100 µm, is interesting in particular. This also makes it advantageous with respect to some conventional grains such as e.g. the tough and hard zirconia corundum that could otherwise be considered, which is to date not available in fine grain. The high solids content of the lacquer allows a mechanically hard, impact-resistant coating to be formed. This facilitates the handling of lacquered machine parts.

The lacquer can be mixed using a dissolver disc. As a result of the high internal friction of the lacquer, there can be a sharp temperature increase during mixing, which can in turn promote an enlargement of the molecules contained in the lacquer. Furthermore, there can be a crushing of the hard particles. For these reasons, the mixing time and the rotational speed of the dissolver disc can be limited to a required minimum level for a sufficient mixing.

A typical inventive formulation thus looks as follows (the % specifications are each made with reference to a given base and represent the respective proportion of it in vol %):

The lacquer contains a solvent content (e.g. naphtha) of 20% to 40%, in particular 30%.

After deducting the solvent content, the remaining dry content is composed as follows, wherein the total dry content is used as the reference value for the percentages:
- 20-40%, in particular 30%, one-component moisture-curing polyurethane (based on aromatic polyisocyanate),
- 50-80% solids content,
- up to 10% additives (solid or liquid).

With a polyurethane content of less than 20%, problems occur with regard to the adhesion of the lacquer to the surface of the machine part; above 40% the corrosion protection effect of the lacquer is no longer ensured, since a continuous electrical connection over the entire volume of the lacquer coating can no longer be assumed.

The solids content has the following composition, wherein the total solids content is used as the reference value for the percentages:
- 30-70%, preferably 40-60%, in particular 40% titanium boride of grain size 700 mesh,
- 30-70%, preferably 40-60%, in particular 60% zinc with grain size 5 µm.

The residual surface moisture of the TiB2 is specified at <0.1%, which is relevant due to the moisture-reactive binder. Up to 20% of the titanium boride can be replaced with boron carbide B4C. The zinc is admixed to the lacquer in particular in the form of zinc powder. The zinc powder also can be replaced in part with zinc lamella. Provided no zinc lamella is included, thixotropic additives can be provided.

Typical declared ingredients can be: zinc powder, zinc dust, stabilized/zinc powder, zinc dust, not stabilized/zinc oxide/zinc lamellae/zinc phosphate/1,3,5-trimethylbenzene/mesitylene/xylene, mixture of isomers/cumene/diphenylmethane diisocyanate, isomers and homologues/1,2,4-trimethylbenzene/solvent naphtha.

For the friction fit connection between two machine parts, it can proceed as follows in the context of the invention.

First, one of the machine parts is coated with the lacquer in the area of a surface, on which the other machine part having an opposing surface shall come into abutment. A coating with the lacquer is possible at temperatures down to the freezing point and below. After the drying of the lacquer, the coated surface and the opposing surface are brought together into abutment and pressed against each other with a predetermined contact pressure.

The contact pressure is chosen to be so high that at least some of the hard particles contained in the lacquer are pressed into both the coated surface and in the opposing surface, and thereby produce local depressions in both surfaces. The contact pressure can for example be approximately 100 MPa and can be generated by clamping the machine parts against each other by using screws. The contact pressure need not necessarily be continuously maintained at this level. Generally speaking, a decrease of up to 20% of its original value does not yet lead to a failure of the friction fit connection. However it is important that a sufficiently high pressure is exerted initially.

To facilitate the application and for increasing the application certainty, the lacquer can contain color indicators and/or structural indicators. The degree of drying can be indicated by using a first indicator. Thus the lacquer in the wet state, i.e. directly after the application, can have a dark grey color, which increasingly lightens upon drying to a medium grey. In this way it can be determined whether the lacquer is sufficiently dry, and whether the machine part to which it was applied can thus be mounted. A further indicator can indicate how strongly the coating has already been mechanically loaded. In this case, for example, upon a dismounting, a machine part provided with the coating can be checked as to whether a correct contact pressure was present, and it is apparent that the machine part was already mounted and the coating must be replaced before a renewed mounting. The further indicator can in particular be a combined color and structural indicator, which irreversibly confers a fine silver/grey mottled appearance to the coating depending on the strength of the mechanical load.

A schematic drawing of the friction fit connection formed with the inventive method is shown in FIG. 1. As is explained in more detail below, in this friction fit connection the coating thickness of the system and the grain size to be chosen are necessarily interrelated.

The friction fit connection is formed between a first component 1 and a second component 2. The components 1, 2 can be any machine parts. In particular it can be a pairing of a bearing ring and a housing or frame part, with which the bearing is connected via the friction fit connection in a manner that prevents relative rotation. Likewise it can for example be a pairing of two bearing rings.

The first component 1 has a first abutment surface 3 and the second component 2 a second abutment surface 4, wherein the first abutment surface 3 and the second abutment surface 4 are disposed facing towards each other and are spaced apart from each other. The region between the first abutment surface 3 and the second abutment surface 4 is filled with a friction coating 5. The friction coating 5 can be formed by applying the inventive lacquer for example to the first abutment surface 3 and subsequently drying. The friction coating 5 includes electrically conducting hard material grains 6, in particular in the form of hard material particles made of titanium boride. Furthermore, the friction coating 5 has a lamellar corrosion protection material 7, in particular in the form of zinc lamellae and a powdery corrosion protection material 8, in particular in the form of zinc powder. All ingredients of the friction coating 5 are bound in a matrix 9, in particular in the form of a binder of polyurethane.

From FIG. 1 it is apparent that the hard material grains 6 have larger dimensions than the thickness of the compressed friction coating 5 and thus protrude from both sides of the friction coating 5 and are pressed into both the first abutment surface 3 of the first component 1 and the second abutment surface 4 of the second component 2. In this way, friction fit microconnections between the hard material grains 6 and the two components 1, 2 are formed, which consequently have a very high coefficient of friction. In polished bearing rings, for example a coefficient of friction of approximately 0.48 can be achieved. The lamellar corrosion protection material 7 and/or the powdery corrosion protection material 8 can abut in a contacting manner on the hard material particles 6 and thus form an electrically conductive connection. There are also many contacts between the lamellar corrosion protection material 7 and the powdery corrosion protection material 8, and thus there are many electrically conducting connections. In addition, there are contacts of the electrically conducting ingredients of the friction coating 5 with the first abutment surface 3 and the second abutment surface 4. In this way, a continuous electrically conducting connection is formed over the entire volume of the friction coating 5, so that the lamellar corrosion protection material 7 and the powdery corrosion protection material 8 contained in the friction coating 5 can reliably protect the abutment surfaces 3, 4 from corrosion.

In addition, the friction coating 5 is very capable of bearing loads due to the lamellar corrosion protection material 7 and the powdery corrosion protection material 8, so that a very mechanically stable connection can be formed between the components 1, 2 with the friction coating 5, which connection is also not loosened or worn by intermittently-occurring pressure peaks, and its dimensional accuracy is also not impaired. A similar effect can also be achieved with other solid materials, which have sufficient load-bearing capacity but offer no corrosion protection. However, this would not reach a significant level solely with the polyurethane, since polyurethane gives way to spawning and spreads by creeping or flowing.

The following considerations are based on the assumption that always only one surface of the mechanical pairing, i.e. one of the abutment surfaces 3 and 4 shown in FIG. 1, is lacquered, which also reduces the manufacturing costs.

Grains that are clearly larger than the coating thickness of the lacquer make the surface rough and already impede the application and also the handling of the finished coated parts with e.g. hoisting slippage. The surface is uneven and acts as an abrasive on its surroundings. Due to the rolling effect of large grains, when applied by the roller an insufficient coverage of the coating can occur behind the grain.

Grains that are substantially smaller than the coating thickness, and which cannot be supported on other solids, are ineffective in the only partially elastic PU-Zn matrix and do not lead to mechanical meshing. Either the introduction of the grains in a hard matrix is necessary (e.g. electroless nickel plating) or the grain must reach both mounting parts. When choosing an elastic matrix, relatively large grains are therefore to be used. On the other hand, it is not required that the diameter of all hard material particles corresponds to the coating thickness, which in turn would be very detrimental to the adhesion of the lacquer. The high loading with solids made of zinc and TiB2 or TiB2 and B4C ensures that even with a small grain a complete yielding does not occur in the PU matrix.

Furthermore, under the very high load of the screwing of the flange or other machine parts, a creeping of the non-solid content of the lacquer, i.e. the PU, is partially inevitable, up to full-surface contact, with the zinc powder contained therein. Suitable values for the contact pressure generated by the screwing with reaching a flat abutment are at approximately 100 MPa. Starting from this value, an increase to 300 MPa then leads to a relatively low residual settling of at most 2 µm. A creeping is not observed. The initial compression is at approximately 5 µm with a coating thickness of approximately 35 µm. The total yielding of the coating system is nevertheless to be regarded as minor due to the solids content of typically 70%. Here the hard material particles additionally help to prevent an accompanying creeping of (lubricious) zinc contents. Due to the high adhesiveness of the lacquer coating, no peeling of the lacquer layer and no transfer of the lacquer coating to the non-lacquered opposing surface is visible, even with the above-mentioned contact pressure after a dismounting of the machine part. A removal of the lacquer coating with a solvent is not possible, so that for a further use of the machine part the lacquer coating must be mechanically removed and replaced with a new lacquer coating, in order to again achieve very high coefficients of friction.

An initially greater compensating ability of the lacquer coating relative to e.g. silicate lacquers by creeping (plastic) and elasticity is desired, in order to even out differences in the thickness of the application and to be able to attain a full-surface abutment of large joining surfaces. Moreover, the hard material particles are exposed by the creeping. As a consequence of the creeping, a waterproofing or sealing occurs, so that for example no corrosive fluids can penetrate between the joining surfaces.

A PU-zinc lacquer with 70% zinc in the dry coating can be (always assuming sufficiently large contact surfaces) compressed by slightly more than 30% and then attains a quasimetallic hard state. Precisely such a lacquer with non-flowing hard material particles has an even lower creeping effect. For example a 35 µm grain in a 40 µm coating reaches a two-sided hard state directly upon mounting.

In general it is sufficient to use a sieve for the hard material particles whose maximum grain size is above the desired coating thickness, and whose maximum is still within the Gaussian distribution for the grain size.

If the lacquer application thickness is not precisely controllable, larger grains can increase the certainty in the application.

According to one embodiment, a coating of the thickness 20-45 µm (dry state) is formed. Such a coating thickness can be achieved with a one-coat application of PU. Smaller coating thicknesses generally—even with conventional zinc—do not exhibit sufficient corrosion protection. The lacquer can contain TiB2 powder in mesh size of 400, which has maximum grain size (×100) of approximately 50 µm and a peak amount (×50) of 15 µm. Alternatively thereto, the lacquer can also contain for example TiB2 powder in mesh size of 700 with maximum grain size (×100) of approximately 100 µm and a peak amount (×50) of 15 µm. The grain size of the zinc powder is matched to the grain size of the hard material powder such that a bulk density that is as high as possible is achieved.

Good results can be achieved, for example, with a content of 60% TiB2 in mesh size of 400 with a target coating thickness of 25±5 µm, in particular 25-30 µm. The grain size of the zinc powder is approximately 5 µm. At a contact pressure of 100 MPa, a compression of the coating thickness of approximately 4 µm results. Thereafter any initial unevennesses of the coating are largely evened out and cavities in the coating are largely filled, so that the machine parts each abut on the coating in a complete surface manner. If the contact pressure is increased to 300 MPa, the coating thickness is reduced once again by approximately 2 µm. No significant further reduction of the coating thickness can be achieved by a further increase of the contact pressure. This is essentially due to the high load-bearing capacity of the compressed zinc powder, which is also prevented from a lateral flow movement by the hard material particles. The flowability of the polyurethane is also greatly reduced by the zinc powder and the hard material particles. Thus overall a highly-mechanically-loadable and very stable coating is formed. For a reliable friction fit connection of two machine parts made of a hard steel, the contact pressure under the given conditions should be at least 100 MPa.

The same is true for 60% TiB2 in a mesh size of 700 with a target coating thickness of 40±10 µm, in particular 35-40 µm. Here too the grain size of the zinc powder is approximately 5 µm. With a contact pressure of 100 MPa, a compression of the coating thickness of approximately 5 µm results. If the contact pressure is increased to 300 MPa, the coating thickness is reduced once again by approximately 5 µm. For a reliable friction fit connection of two machine parts made of a hard steel, the contact pressure under the given conditions should be at least 200 MPa.

Likewise, a content of 40% TiB2 in a mesh size 700 with a target coating thickness of approximately 35 µm is also possible. Here too the grain size of the zinc powder is approximately 5 µm. With a contact pressure of 100 MPa, the compression of the coating thickness varies somewhat with the degree of crosslinking of the polyurethane. With a low crosslinking, a compression of the coating thickness of approximately 5 µm results. With a higher crosslinking, the elasticity is lower, and accordingly a somewhat lower compression of approximately 4 µm also results. If the contact pressure is increased to 300 MPa, the coating thickness in both cases is reduced once again by approximately 1 or 2 µm, so that in each case a reduction in total of approximately 6 µm results.

Both powders contained in the lacquer—or in the case that B4C is additionally used, all three powders—are matched to one another according to size and designed for a target thickness range of the finished one-layer coating. The same basic formulation with different powder grain sizes is used for a variety of target coating thicknesses. The different coating thickness is set by the grain size of the powder used and simultaneously by the viscosity of the PU binder. A higher addition of solvent (VOC) reduces the viscosity and makes the coating thinner—and vice versa.

Zirconium oxide balls (ZrO$_2$ with SiO) with a grain size of e.g. 10-30 µm are additionally used in a further variant. These have a hardness of only 700 HV, but represent an incompressible solid filling and have no tendency to splinter. They produce, if necessary, a defined spacer as required due to their ball shape and very precise sieve size. If a coating is needed of a defined thickness, a portion of zirconium oxide balls can stop the sliding of the zinc-PU matrix and can stop the penetration depth of the titanium boride grains at a predictable coating thickness.

In order to achieve the most optimal results possible, after the application the binder must be prevented from sagging in the wet state. This requires a thixotropic adjustment. For this reason, it is advantageous if a thixotropic agent is added to the lacquer. The lacquer is more fluid with movement (application), more rigid without movement (drying).

The internal electrical contact in the lacquer can be improved if not only zinc powder is used, but also a portion of zinc lamellae. The optimal packing density is obtained in a mixture of zinc powder and zinc lamellae with more contact surfaces with each other. The addition of zinc lamellae also produces thixotropy. The content of lamellar conductive solids can also consist entirely or partially of micaceous iron oxide instead of zinc lamellae.

Instead of a 1-component polyurethane, a 2-component polyurethane or a 2-component epoxy resin can also be used. However, neither adhesion nor formability is achievable with a silicate binder, so this binder is eliminated.

There is also the possibility to combine two coatings with each other, which are each optimized for one of the properties of corrosion protection or increase of the coefficient of friction. For the one coating a 1C-polyurethane zinc powder lacquer can be used for the pure corrosion protection of outer surfaces. For the other coating, which is applied to a joining surface for increasing the coefficient of friction, another mixture from the same 1C-PU base can be used, to which hard material particles are added. The two products tolerate each other, because of the same binder, and the coatings can therefore overlap on the bearing without problems. To avoid confusion, one of the products can be lightly colored, e.g. zinc lacquer light reddish, and friction lacquer pure grey.

REFERENCE NUMBERS

1 First component
2 Second component
3 First abutment surface
4 Second abutment surface
5 Friction coating
6 Hard material grains
7 Lamellar corrosion protection material
8 Powdery corrosion protection material
9 Matrix

What is claimed is:

1. A bearing component comprising:
    a bearing inner ring or a bearing outer ring having a coating, the coating comprising a layer of a moisture-curing one-component polyurethane system that contains hard material particles made of a titanium-boron compound.
2. The bearing component according to claim 1, wherein the hard material particles include titanium boride or consist essentially of titanium boride.
3. The bearing component according to claim 1, wherein the coating further comprises an anticorrosive material.
4. The bearing component according to claim 3, wherein the anticorrosive material comprises zinc.
5. The bearing component according to claim 4, wherein at least a portion of the zinc is in lamellar form.
6. The bearing component according to claim 1, wherein the hard material particles have: a Knoop hardness HK 0.1 of at least 2000 N/mm2 or a Mohs-hardness of at least 8.0 and a specific electrical resistance of at most 1×10-4 Ωcm at room temperature.
7. The bearing component according to claim 1, wherein the coating contains additional hard material particles as a further ingredient.
8. The bearing component according to claim 1, wherein the hard material particles include titanium boride or consist essentially of titanium boride and wherein the layer has a thickness of 20 µm to 45 µm and wherein the hard material particles have a mesh size of 400.
9. The bearing component according to claim 1, wherein the coating is a friction-enhancing coating.
10. The bearing component according to claim 1, wherein the hard material particles include microserrations.
11. A bearing component comprising:
    a bearing inner ring or a bearing outer ring having a coating, the coating comprising a layer of a one-component polyurethane system that contains hard material particles made of a titanium-boron compound, wherein portions of the hard material particles protrude from at least one surface of the layer.
12. The bearing component according to claim 11, wherein the coating further comprises zinc.
13. The bearing component according to claim 12, wherein the coating further comprises zinc in lamellar form.
14. The bearing component according to claim 11, wherein the one-component polyurethane system is a moisture-curing one-component polyurethane system.
15. The bearing component according to claim 11, wherein the hard material particles include titanium boride or consist essentially of titanium boride.
16. The bearing component according to claim 11, wherein the coating further comprises an anticorrosive material.
17. The component according to claim 11, wherein the hard material particles include microserrations.
18. A bearing assembly comprising:
    a housing having an opening having a radially inner surface; and
    a bearing mounted in the housing opening and comprising
        a bearing inner ring having a radially inner surface and
        a bearing outer ring having a radially outer surface,
    wherein at least one surface selected from the group consisting of the radially inner surface of the housing and the radially outer surface of the bearing outer ring and the radially inner surface of the bearing inner ring includes a friction-enhancing coating, the friction-enhancing coating comprising a layer of a moisture-curing one-component polyurethane system that contains hard material particles made of a titanium-boron compound.

* * * * *